United States Patent [19]

Suga et al.

[11] Patent Number: 4,972,035

[45] Date of Patent: Nov. 20, 1990

[54] PROCESS FOR PREPARING ULTRA-HIGH-MOLECULAR-WEIGHT POLYOLEFIN FINE POWDER

[75] Inventors: Michiharu Suga, Iwakuni; Mamoru Kioka, Ohtake; Toshio Kobayashi, Hiroshima; Akifumi Kato; Michio Endo, both of Ohtake, all of Japan

[73] Assignee: Mitsui Petrochemical Industries, Ltd., Tokyo, Japan

[21] Appl. No.: 317,055

[22] Filed: Feb. 24, 1989

Related U.S. Application Data

[60] Division of Ser. No. 73,322, Jul. 7, 1987, abandoned, which is a continuation of Ser. No. 910,812, Sep. 23, 1986, abandoned, which is a continuation of Ser. No. 697,517, Feb. 1, 1985, abandoned.

[30] Foreign Application Priority Data

Feb. 3, 1984 [JP] Japan ............................ 59-16996

[51] Int. Cl.$^5$ ............................. C08F 2/14; C08F 4/52
[52] U.S. Cl. ................................... 526/125; 526/124; 526/142; 526/352; 526/906; 526/907; 526/908; 526/909

[58] Field of Search ............... 526/125, 352, 906, 907, 526/909, 124, 142, 908; 428/402

[56] References Cited

U.S. PATENT DOCUMENTS

| | | | |
|---|---|---|---|
| T901,021 | 8/1972 | Vernick | 524/586 |
| 3,676,419 | 7/1972 | Takehisa et al. | 526/909 X |
| 3,847,888 | 11/1974 | Baumgaertner | 526/352 |
| 3,984,387 | 10/1976 | Liu et al. | 526/74 |
| 4,401,589 | 8/1983 | Kioka et al. | 502/112 X |

OTHER PUBLICATIONS

Chem. Abstracts, 84(22): 151700p.
S. S. Schwartz et al., "Plastics Materials and Processes", Van Nostrand Reinhold Co., N.Y. (1982), p. 74.

*Primary Examiner*—Joseph L. Schofer
*Assistant Examiner*—F. M. Teskin
*Attorney, Agent, or Firm*—Sherman and Shalloway

[57] ABSTRACT

Ultra-high-molecular-weight polyolefin fine powder characterized in that said fine powder has an intrinsic viscosity measured in decalin at 135° C. of at least 10 dl/g and an average particle diameter in the range of 1–80 μm, at least 20 weight % of the powder passing through 350 Tyler mesh screen.

6 Claims, 2 Drawing Sheets

10μ

20μ

100μ

100μ

PROCESS FOR PREPARING ULTRA-HIGH-MOLECULAR-WEIGHT POLYOLEFIN FINE POWDER

This application is a division of application Ser. No. 073,322 filed July 7, 1987, now abandoned, which is a continuation of Ser. No. 910,812 filed Sept. 23, 1986, now abandoned, which is a continuation of Ser. No. 697,517 filed Feb. 1, 1985, now abandoned.

The present invention relates to ultra-high-molecular-weight polyolefin (hereinafter called ultra-high-mw polyolefin) fine powder, and more particularly, to ultra-high-mw polyolefin fine powder capable of providing various uses such as a molded article having an excellent material on blending with an inorganic filler.

Ultra-high-mw polyolefins represented by an ultra-high-molecular-weight polyethylene are being used for many applications such as mechanical parts, lining materials and sport outfits as resins that are light in weight, and have high abrasion, impact and chemicals resistance and good self-lubricity.

However, since ultra-high-mw polyolefins seldom show flowability even in the molten state, processing is difficult, the molded article surface is not cleanly finished in some cases depending upon the shape of the article or the molded article does not show sufficient strength through molding irregularities. Particularly a molded article with a great amount of an inorganic filler blended has a poor external appearance, and physical properties such as impact strength and extensibility tend to decrease with the increase of inorganic filler loadings.

U.S. Patent Defensive Publication T901,021, discloses an ultra-high-mw polyethylene composition in which a polyethylene having an intrinsic viscosity of about 15-30 dl/g contains about 0.05-1 weight % of carbon black based on the total weight of the polymer. In this U.S. Patent Defensive Publication T901,021, there is no description anywhere of the particle diameter or particle size distribution of the ultra-high-mw polyethylene at a time when it is mixed with carbon black.

On the other hand, U.S. Pat. No. 4,246,390 discloses that the thermal treatment of an ultra-high-mw polyethylene can afford molded pieces having better properties with respect to transparency, surface gloss and low-temperature mechanical properties. In Examples of this U.S. Pat. No. 4,246,390 was used a commercial ultra-high-mw polyethylene powder, more than 99% of the powder passing through 60 mesh screen. The ultra-high-mw polyethylene powder claimed in this U.S. patent, as mentioned above, still contains particles of comparatively large particle diameter.

BRIEF SUMMARY OF THE INVENTION

It is the object of the present invention to provide an ultra-high-mw polyolefin fine powder having a specified particle diameter and a specified particle size distribution.

It is another object of the present invention to provide an ultra-high-mw polyolefin fine powder that has good dispersion properties and is capable of forming a molded article which has excellent physical properties even when this powder is blended with an inorganic filler.

It is still another object of the present invention to provide an ultra-high-mw polyolefin fine powder that per se has excellent flowability and is easily handled in the powdery state, and moreover, has easy processibility in the molten state.

Further objects and advantages of this invention will become readily apparent as the following detailed description of the invention unfolds.

According to the present invention, such objects and advantages of the invention are to provide an ultra-high-mw polyolefin fine powder characterized in that the intrinsic viscosity measured in decalin at 135° C. is at least 10 dl/g, at least 20 weight % of the powder passing through 350 Tyler screen and the average particle diameter ranges from 1-80 μm.

DETAILED DESCRIPTION OF THE INVENTION

The polyolefin fine powder of the invention is such that an intrinsic viscosity [η] measured in decalin at 135° C. is preferably 13-50 dl/g. Polyolefins having an intrinsic viscosity below 10 dl/g do not have extremely high molecular weight and are not so poor in their processibility as ultra-high-mw polyolefins. And in general they are inferior to ultra-high-mw polyolefins in their mechanical properties, and thus, polyolefins having an intrinsic viscosity below 10 dl/g are not included in the present invention.

The polyolefin fine powder of the invention is such that preferably at least 50 weight % and more preferably 60-100 weight % of the portion passes through 350 Tyler mesh screen. And the polyolefin fine powder of the invention has an average particle diameter of preferably 1-50 μm, and more preferably 3-30 μm.

It is difficult for the fine powder having an average particle diameter above 80 μm to afford a molded article with an inorganic filler blended having its fully satisfactory external appearance and physical properties, and the one having an average particle diameter less than 1 μm cannot afford a dry powder with good flowability because of intense agglomeration among powder particles. And since agglomeration among powder particles was intense even with the addition of an inorganic filler, the effect as fine powder could not be realized as expected.

On the other hand, since besides the ultra-high-mw polyolefin fine powder having an average particle diameter of 1-80 μm, as mentioned above, the component that passes through 350 mesh screen occupies at least 20 weight %, it provides a molded article excellent in its external appearance and physical properties, particularly when molding is conducted with an inorganic filler blended. An advantage is that an inorganic filler can be blended in a great amount, and yet deterioration of physical properties is little.

The ultra-high-mw polyolefin fine powder of the invention has such particle diameter that more than 95 weight % and particularly above 98 weight % and more particularly substantially the total amount passes through 100 Tyler mesh screen.

Figure 1:
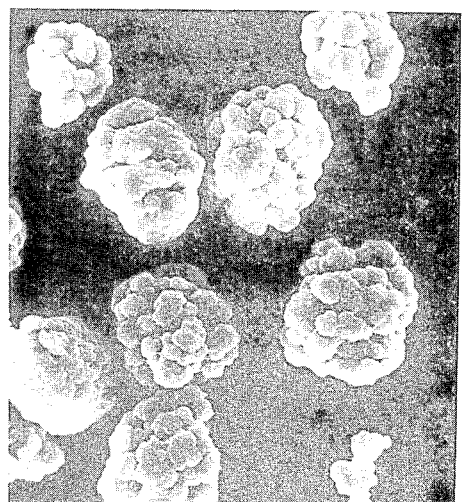
FIGS. 1 and 2 are enlarged photographs of ultra-high-mw polyethylene powder prepared according to the invention.

The external appearance of each particle of the ultra-high-mw polyolefin fine powder of the invention under microscopic observation shows a state as if its being composed by bonding of a plurality of nodules by fusion. Each particle of the fine powder will be said to be almost spherular as is shown in FIG. 1 in the state where a plurality of nodules bond to each other comparatively in a lump. Thus, being almost spherular is not an expression that calls it to account whether the surface state of each particle is smooth or rugged, but it means that the external rough shape has a spherular, elliptical or cocoon-like shape. On the other hand, in a state where a plurality of nodules bond to each other in a comparatively wide spread, each particle of the fine powder will be said to be as if being in a state of a bunch of grapes (FIG. 2) where the bonding of nodules which makes the fine particle's appearance observable is little.

At anyrate, the ultra-high-mw polyolefin fine powder of this invention has, as mentioned above, such a small particle diameter and particle size distribution as mentioned above, for instance, it can intermingle with an inorganic filler well and form an inorganic-filler-blended molded article having good physical properties.

The bulk density of ultra-high-mw polyolefin fine powder of the invention is usually 0.10–0.50 g/cm$^3$, preferably 0.15–0.40 g/cm$^3$. And its angle of repose is ordinarily 30°–80°, preferably 40°–60°. The density of ultra-high-mw polyolefin fine powder of the present invention tends to be lower than the conventional ultra-high-mw polyolefin fine powder, its angle of repose having a tendency to be large.

An ultra-high-mw polyethylene powder was so far put on the market by several companies, but there was none that was provided with all the requirements of the present invention. That was not sufficiently satisfactory. For example, some had coarse particles, some had low percentage of fine powder and some was formless. Particularly when an inorganic-filler-blended molded article was molded, the one with good physical properties was unobtainable.

There are advantages to the ultra-high-mw polyolefin fine powder of the present invention, as was mentioned above, having good dispersion properties at the time of blending an inorganic filler and remarkably improving physical properties of a molded article comprising a blended composition as compared with the conventional ultra-high-mw polyethylene powder that is different from that of the present invention in its particle diameter and particle size distribution as well as being superior to the conventional ultra-high-mw polyolefin powder in powder lubricity and easiness of its handling.

The subject polyolefins in the present invention are preferably a homopolymer or copolymer of ethylene or α-olefins. For example is listed a homopolymer such as polyethylene, polypropylene, poly-1-butene and poly-4-methyl-1-pentene or a copolymer of ethylene with other $C_3$-$C_{10}$ α-olefins such as propylene, 1-butene, 1-hexene, 1-octene and 4-methylene-1-pentene having ethylene content of preferably at least 85 mol %, more preferably at least 90 mol %.

Preferably the ultra-high-mw polyolefin powder of the invention can directly be prepared by either of the following polymerization processes:

(A) A process for subjecting to further high-speed shearing treatment the ultra-high-mw polyolefin powder slurry formed by polymerizing olefins under a specified condition in the presence of a specified Ziegler catalyst.

(B) A process for obtaining a specified Ziegler catalyst of fine dispersion type by subjecting preliminarily the specified Ziegler catalyst to high-speed shearing treatment, conducting olefin polymerization under a specified condition in the presence of the catalyst, and if necessary subjecting the thus obtained powder slurry to shearing treatment at high speeds.

Now, these processes will be specifically described.

The specific Ziegler polymerization catalysts to be used in said processes (A) and (B) are basically the ones having specific performance formed from a solid titanium catalytic component and an organic aluminum compound catalytic component. It has been found out that as the solid titanium catalytic component constituting the catalyst to be used in process (A), a highly active, particulate catalytic component having a narrow particle size distribution and an average particle diameter of around 0.1–around 3 μm, in which several fine spherules bond together may be used. The highly active particulate titanium catalytic component having such specific performance can be manufactured by strictly adjusting the condition of deposition at the time of depositing a solid product by bringing a magnesium compound in a liquid state into contact with a titanium compound in a liquid state according to the teaching of e.g., Japanese Laid-open Patent Application No. 811/81 corresponding to U.S. Pat. No. 4,401,589. There is exemplified a method disclosed in said application, in which a hydrocarbon solution in which magnesium chloride is dissolved in a higher alcohol is mixed with titanium chloride at low temperatures, and then at a time when a solid product is deposited with temperature rise to around 50°–100° C., as small an amount as 0.01–0.2 mol of a monocarboxylate such as benzoate is allowed to coexist against 1 mol of magnesium chloride and said deposition is conducted under vigorous agitation. The deposited solid product may be washed if necessary. Thus, a solid catalytic component satisfactory in both activity and particle performance is obtainable. Such a catalytic component contains, for example, about 1–about 6 weight % of titanium, halogen/titanium (atomic ratio) ranging from about 5–about 90 and magnesium/titanium (atomic ratio) about 4–about 50.

And it has been found that as the solid titanium catalytic component constituting the specific Ziegler polymerization catalyst to be used in process (B), fine spherules having a narrow particle size and an average particle diameter of ordinarily 0.01–5 μm, preferably 0.05–3 μm may be used. The catalytic component of the highly active, particulate titanium catalytic component having such performance is obtainable by subjecting to high-speed shearing treatment said slurry of the solid titanium catalytic component adjusted by said process (A). As a method of high-speed shearing treatment, a solid titanium catalytic component slurry is treated in an inert gas atmosphere for appropriate hours with the use of a wet type atomizing machine. To prevent the decrease in catalytic performance at that time, a method can be employed, in which an equimolar amount of an organic aluminum compound with titanium is preliminarily added in some cases. Further, a method can also be employed in which coarse particles are removed by filtering with screen the thus treated slurry. By these methods is obtained said highly active, particulate titanium catalytic component having fine particle diameter.

Polymerization in methods (A) and (B) is conducted by jointly using said highly active, particulate titanium catalytic component and an organic aluminum compound catalytic component, for example, trialkylaluminum such as triethylaluminum and triisobutylaluminum, dialkylaluminum chloride such as diethylaluminum fluoride and diisobutylaluminum chloride, alkylaluminum sesquichloride or the mixture thereof, if necessary with the joint use of an electron donor, and conducting slurry polymerization of the olefin in a hydrocarbon medium such as pentane, hexane and heptane and ordinarily at temperatures of 20°–100° C. At this time, it is desirable that each catalytic component be used so that the concentration of the titanium may be around 0.001–1.0 millimol converted into atom and so that the organic aluminum compound catalytic component may be around 1–1000 in Al/Ti (atomic ratio) and that operation be carried out so that the slurry concentration of the polyolefin may be around 50–400 g/l. In preparing an ultra-high-mw polyolefin having the desired intrinsic viscosity, polymerization temperature or hydrogen in small quantities as a chain transfer agent may be adjusted.

The thus obtained ultra-high-mw polyolefin is such that catalyst residues are little, ordinarily Ti content is 10 ppm or below and chlorine content is 200 ppm or below in the state of removing no ashes, and there is little rusting at the time of molding or bad effect to product quality.

As a method of high-speed shearing treatment can be specifically exemplified a method of conducting pulverizing treatment with the use of a pulverizer such as a commercial homomickline mill. For example, at the time of using a commercial homomickline mill, with a clearance of the stator of 0.2 mm, a slurry is recycled and continuously treated for one hour and further at the time of feeding the slurry to the subsequent after-treatment step, the total amount of the slurry is passed through a wet type atomizing machine to effect shearing treatment effectively. By these methods the above ultra-high-mw polyolefin powder slurry is subjected to high-speed shearing treatment to obtain the ultra-high-mw polyolefin fine powder.

The ultra-high-mw polyolefin fine powder of the present invention is capable of being made into various shapes of molded articles by various molding processes such as injection molding, extrusion molding and compression molding.

In molding, various additives ordinarily blendable with polyolefins may be added. The ultra-high-mw polyolefin fine powder of the invention is suitable for uses for preparing molded articles with an inorganic filler blended in as great amounts as around 10–70 weight parts, preferably around 20–50 weight parts, per 100 parts of said polyolefins.

As an inorganic filler usable for such a purpose, can be exemplified carbon black, graphite carbon, silica, talc, clay, calcium carbonate, magnesium oxide, magnesium hydroxide, alumina, aluminum hydroxide, hydrotalcite, zinc oxide, titanium oxide, glass ceramics, boron compounds (eg $B_2O_3$, $B_4C$), glass fiber, carbon fiber and titanium fiber.

These inorganic fillers, if particulate, are used with an average particle diameter of 0.1–30 μm preferably 0.1–10 μm and if in fiber form, they are better used with a diameter of 3–30 μm.

Further, the average particle diameter ($D_{50}$) of ultra-high-mw polyolefin fine powder of the present invention is the particle diameter corresponding to cumulative fraction 50% on the particle size cumulative distribution curve of the ultra-high-mw polyolefin fine powder, measured by Coulter Counter (Model TAII) made by Coulter Electronics.

With reference to Examples, the present invention will be described in detail below.

Further, the particulate titanium catalytic component to be used in the following Examples was prepared as follows:

47.6 g (0.5 mol) of anhydrous magnesium chloride, 0.25 l of decane and 0.23 l (1.5 mol) of 2-ethylhexyl alcohol were heat reacted at 130° C. for 2 hours to prepare a uniform solution, and then 7.4 ml (50 millimol) ethyl benzoate was added. This uniform solution was added dropwise in agitation to 1.5 l of $TiCl_4$ maintained at $-5°$ C. for 1 hour. The used reactor was a glass separable flask having a capacity of 3l, agitation velocity being 950 rpm. Temperature was raised to 90° C. after the dropping and reaction was conducted at 90° C. for 2 hours. After the termination of the reaction, the solid portion was collected through filtration, and further washed thoroughly with hexane to obtain a highly active, particulate titanium catalytic component. The catalytic component contained 3.8 weight % of titanium atoms.

EXAMPLE 1

(a) In a polymerizer having an inner capacity of 2,750 l were placed 1,500 ( of n-decane, 1,500 millimol of triethylaluminum and 15 millimol of a particulate titanium catalytic component and temperature was raised to 70° C. Afterwards, ethylene gas was fed into the polymerizer at a velocity of 30 $nm^3$/hr. Polymerization pressure was 1–6 $kg/cm^2G$.

When the cumulative amount of the fed ethylene became 180 $nm^3$, the feeding was stopped. After 10 minutes, polymerization was conducted, and an ultra-high-mw polyethylene slurry was obtained by conducting cooling and removing pressure. This slurry was subjected to high-speed shearing made by treatment for 1 hour with the use of Homomic linemill (Tokushu Kiko Kogyo Co. LTD. in Japan). The obtained polymer and solvent were separated with a centrifuge and drying was conducted under reduced pressure in $N_2$ current at 75° C.

The yield of the thus obtained polymer was 255 kg, intrinsic viscosity measured in decalin at 135° C. being 23.3 dl/g. The outer shape was spherular and 20–30 μm in diameter. Some were agglomerated. Average particle diameter ($D_{50}$) was 26 μm and the total amount of particles could pass through 100 Tyler mesh screen, 65% of them passing through 350 mesh screen. Further, the amounts in passage through 100 Tyler mesh screen and 350 mesh screen were measured with a Powder Tester (Type PT-E) made by Hosokawa Micron Company in Japan. And bulk density was 0.28 $g/cm^3$ and an angle of repose 50°. An enlarged photograph in 1000 (×) magnifications is given in FIG. 1.

(b) The ultra-high-mw polymer fine powder was blended with graphite carbon (made by Japan Graphite KK, Cp.S; average particle diameter was 4–5 μm) at a weight ratio of polymer to graphite carbon of 80 to 20, and a press sheet 10 mm thick was obtained by press molding. This sheet was cut and physical properties were measured. The results of measurement are given in Table 1.

EXAMPLE 2

(a) Polymerization was conducted at 80° C. in the same way as Example 1 to obtain a spherular polymer with [η] 15.7 dl/g (intrinsic viscosity measured in decalin at 135° C.). The average particle diameter ($D_{50}$) was 23 μm, the total amount of the polymer passing through 100 mesh screen and 66% of the same 350 mesh screen. Bulk density was 0.27 g/cm$^3$ and an angle of repose 50°.

(b) With the use of extra-high-mw polyethylene fine powder obtained in (a), the same test as Example 1, (b) was conducted. The test results are given in Table 1.

EXAMPLE 3

(a) The titanium catalytic component obtained as above was suspended in hexane so as to have a concentration of millimol/l and the thus obtained slurry was subjected to high-speed shearing treatment with Homomixer (made by Tokushu Kiko Kogyo Co., Ltd. of Japan) to obtain particulate catalyst.

As in Example 1, polymerization was conducted with the use of said catalyst to obtain a spherular polymer having [η] 21.1 dl/g. The average particle diameter ($D_{50}$) was 40 μm, the total amount of the polymer passing through 100 Tyler mesh screen and 76% 350 Tyler mesh screen. And bulk density was 0.37 g/cm$^3$ and an angle of repose 40°.

(b) The same test as Example 1, (b) was conducted with the use of ultra-high-mw polymer fine powder obtained in the above (a). The test results are given in Table 1.

EXAMPLE 4

(a) In the same way as Example 2, with the addition of 23 mM of a titanium catalytic component, polymerization was conducted at 75° C. to obtain spherular polymer with [η] 22.3 dl/g. Average particle diameter ($D_{50}$) was 31 μm, the total amount of the polymer passing through 100 mesh screen and 68% 350 mesh screen. Bulk density was 0.34 g/cm$^3$ and an angle of repose 45°.

(b) With the use of ultra-high-mw polymer fine powder obtained in the above (a), the same test as Example 1, (b) was conducted. The test results are given in Table 1.

EXAMPLE 5

(a) High-speed shearing treatment of the slurry was omitted after polymerization was conducted as in Example 1. Average particle diameter of the thus obtained polymer was 60 μm, 89% of the polymer passing through 100 mesh screen and 50% 350 mesh screen. Bulk density was 0.23 g/cm$^3$ and an angle of repose 60°.

(b) With the use of ultra-high-mw polymer fine powder obtained in the above (a), the same test as Example 1, (b) was conducted. The test results are given in Table 1.

COMPARATIVE EXAMPLE 1

(a) In the same way as Example 1, with the use of titanium catalyst having an average particle diameter of 8–10 μm, polymerization was conducted to obtain polymer with [η] 19.9 dl/g. Average particle diameter was 140 μm, 20% of the polymer passing through 100 mesh screen and 3% 350 mesh screen. And bulk density was 0.41 g/cm$^3$ and an angle of repose 40°.

(b) With the use of ultra-high-mw polymer fine powder obtained in the above (a), the same test as Example 1, (b) was conducted. The test results are given in Table 1.

TABLE 1

| | Tensile strength (kg/cm$^2$) | Tensile elongation (%) | Impact strength (kg · cm/cm$^2$) |
|---|---|---|---|
| Example 1 | 213 | 68 | 36 |
| Example 2 | 194 | 75 | 42 |
| Example 3 | 256 | 72 | 40 |
| Example 4 | 299 | 97 | 36 |
| Example 5 | 165 | 25 | 15 |
| Comparative Example 1 | 137 | 2 | 9 |

Further, conditions of the tensile test and measurement of impact strength are as follows:
Tensile testing method
Test piece: ASTM No. 4 Dumbbell×2 mm thick
Tensile speed: 50 mm/min
Tensile tester: Instron TTM Model
Impact strength
Test piece: 3×5×15 mm
Tester: Dinestat Tester made by Toyo Seiki Works, Ltd.
Hammer capacity: 40 kg.cm

EXAMPLE 6

(a) In a polymerizer having an inner capacity of 35 l were placed 10 ( of n-hexane, 10 millimol of triethylaluminum and 0.2 millimol of the above particulate titanic catalytic component in a conversion to titanium atoms in an inert gas atmosphere and temperature was raised to 70° C. Afterwards, an ethylene gas was fed at a speed of 1 nm$^3$/hr. Polymerization temperature was maintained at 70° C. by jacket cooling and polymerization pressure was 1–2 kg/cm$^2$G.

After 1 hour; addition of ethylene was stopped and cooling and removal of pressure were conducted. The obtained polyethylene and solvent were separated through filtration and polyethylene was dried under reduced pressure under an N$_2$ current at 70° C.

The obtained polymer was such that yield was 1.2 kg. Intrinsic viscosity measured in decalin at 135° C. was 14 dl/g. And its shape was of a bundle of grapes in which spherules with 10–20 μm in diameter were fused and bonded to each other. Average particle diameter ($D_{50}$) was 60 μm, the total amount of the polymer passing through 100 mesh screen and 36% 350 mesh screen. Bulk density was 0.19 g/cm$^3$.

EXAMPLE 7

(a) In a polymerizer having an inner capacity of 280 l were placed 150 l of n-decane, 150 millimol of triethylaluminum and 1.5 millimol of the above particulate titanium catalytic component and temperature was raised to 70° C. Afterwards, an ethylene gas was fed into the polymerizer at a speed of 6 nm$^3$/hr. Polymerization pressure of 1–8 kg/cm$^2$G. When the cumulative amount of the fed ethylene became 18 nm$^3$, the feeding was stopped. After 10 minutes, polymerization was conducted, and cooling and removal of pressure were carried out. The obtained polymer and solvent were separated with a centrifuge. The polymer was rinsed twice with acetone, and then drying under reduced pressure was conducted in an N$_2$ current at 70° C. Yield of the polymer was 22.2 kg and intrinsic viscosity measured in decalin at 135° C. was 17 dl/g and density 0.94 g/cm$^3$.

And the shape was of a bundle of grapes. Average particle diameter ($D_{50}$) was 55 μm, the total amount of the polymer passing through 100 mesh screen and 39% 350 mesh screen. Bulk density was 0.17 g/cm$^3$.

Figure 2:
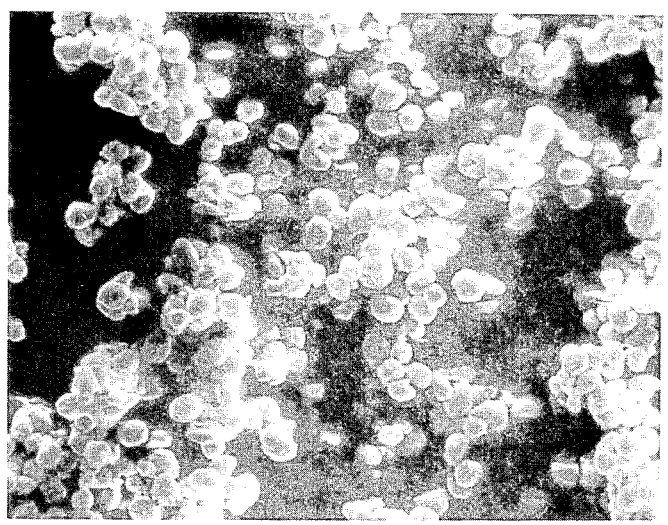

An enlarged photograph at 450(×) magnifications is shown in FIG. 2.

(b) The ultra-high-mw polyethylene obtained in the above (a) was blended with graphite carbon (made by Japan Graphite KK, Cp.S; average particle diameter was 4–5 μm) at a weight ratio of 80-20, and a press sheet 10 mm thick was obtained by ordinary press molding. This sheet was cut and the physical properties were measured. The results of measurement are described in Table 2.

COMPARATIVE EXAMPLE 2

The same test as Example 7, (b) was conducted with the use of a commercial ultra-high-mw polyethylene (made by Mitsui Petrochemical Kogyo KK, Hizex-million 340M) ([η]=22 dl/g, particle diameter=200 μm, 50% of the polyethylene passing through 100 mesh screen and none of the polyethylene 350 mesh screen) instead of the ultra-high-mw polyethylene in Example 7, (b). The test results are given in Table 2.

EXAMPLE 8

Figure 3:
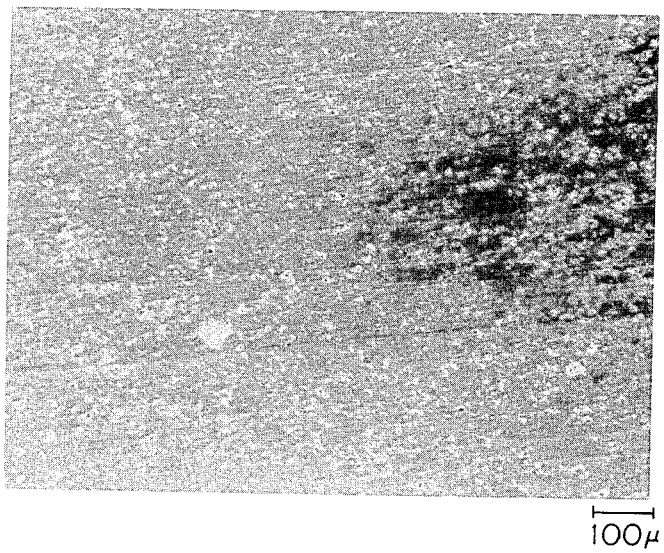
FIGS. 3 and 4 are enlarged sectional photographs of molding prepared from ultra-high-mw polyethylene powder of the invention and of the prior art, respectively.

The ultra-high-mw polyethylene obtained in Example 7, (a) was blended with amorphous silica (®Imcil-P, particle diameter=1 μm, made by Tatsumori Kagaku KK) at a weight ratio of 80 to 20 and press molded. The physical properties are given in Table 2. And a photograph with the cross section of the sheet enlarged to 100(×) magnifications is shown in FIG. 3.

COMPARATIVE EXAMPLE 3

Hoechst ultra-high-mw polyethylene (Hostaler GUR 212, [η]=17 dl/g; average particle diameter=90 m, 60% of the polyethylene passing through 100 mesh screen and 1% 350 mesh screen) was used instead of the ultra-high-mw polyethylene in Example 8. The results are given in Table 2.

COMPARATIVE EXAMPLE 4

Figure 4:
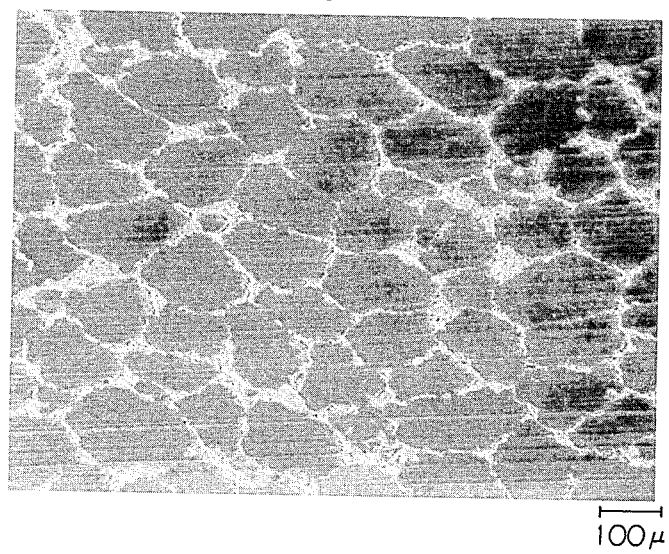

Hizex Million 240M ([η]=17, average particle diameter=200 μm, 50% of the polymer passing through 100 mesh screen and none of the polymer 350 mesh screen) was used instead of the ultra-high-mw polyethylene in Example 8. The obtained physical properties are given in Table 2. A sectional photograph is shown in FIG. 4.

EXAMPLE 9

(a) In the same way as Example 7, polymerization was conducted at 60° C. to obtain a polymer in the shape of a bundle of grapes having an intrinsic viscosity of 17.3 dl/g measured in decalin at 135° C. Average particle diameter was 55 μm, 35% of the polymer passing through 350 mesh screen.

(b) The ultra-high-mw polyethylene in Example 9, (a) was blended with aluminum hydroxide (made by Nippon Light Metal Co., Ltd.; particle diameter=5 μm) at a weight ratio of 30 to 70 and press molded.

The molded article was cut and the ones with 1×2×8 mm in thickness, respectively were subjected to flammability test according to ASTM D635. All of them were nonflammable and in UL specification, the article was V-O, showing its usability as nonflammable materials.

COMPARATIVE EXAMPLE 5

Mitsui Petrochemical Hizex Million 340M was used instead of the ultra-high-mw polyethylene in Example 8, (b) to obtain a molded article which was brittle like a Japanese rice-flour cake and easily destructible with hands. Satisfactory molded articles were unobtainable.

TABLE 1

|  | Tensile strength (kg/cm$^2$) | Tensile elongation (%) | Impact strength (kg · cm/cm$^2$) |
|---|---|---|---|
| Example 7 | 220 | 25 | 46 |
| Comparative Example 2 | 137 | 2 | 2 |
| Comparative Example 3 | 150 | 10 | 15 |
| Example 8 | 320 | 210 | 94 |
| Comparative Example 4 | 240 | 93 | 72 |

What is claimed:

1. A process for preparing an ultra-high-molecular-weight polyolefin fine powder which comprises polymerizing at least one olefin monomer using a Ziegler catalyst which has been subjected to high-speed shearing treatment to obtain an average particle diameter of from 0.01 to 5 μm, said catalyst comprising a highly active, particulate titanium catalytic component and an organic aluminum catalytic component, in a hydrocarbon medium at a temperature between 20° C. and 100° C. to form a slurry of a fine powder of ultra-high-molecular-weight polyolefin which is composed of generally spherular particles, and which has an intrinsic viscosity measured in decalin at 135° C. of at least 10 dl/g and an average particle diameter in the range of 1-80 μm, at least 20 weight % of the powder passing through 350 Tyler mesh screen.

2. The process according to claim 1 wherein the highly active, particulate titanium catalytic component has been prepared by a method which comprises mixing a hydrocarbon solution in which magnesium chloride and a higher alcohol of from 6 to 20 carbon atoms are dissolved with titanium chloride at a temperature of no more than about 50° C., and agitating vigorously the resulting mixture in the presence of a monocarboxylate at a temperature between about 50° C. and about 100° C. to deposit a particulate product and subjecting the particulate product to high speed shearing treatment.

3. The process according to claim 1 wherein the highly active, particulate titanium catalytic component contains about 1 to about 6% by weight of titanium, a halogen-to-titanium atomic ratio ranging from about 5 to about 90 and a magnesium-to-titanium atomic ratio of about 4 to about 50.

4. The process according to claim 1 wherein the organic aluminum catalytic component is selected from the group consisting of trialkyl-aluminum, dialkyl-aluminum halide and alkyl-aluminum sesquichloride.

5. The process according to claim 1 wherein the polyolefin is polyethylene.

6. The process according to claim 1 wherein the Ziegler catalyst further comprises an electron donating compound.

* * * * *